May 18, 1943. L. A. GRAHAM 2,319,319
TORQUE TRANSMITTING DEVICE
Filed April 15, 1942
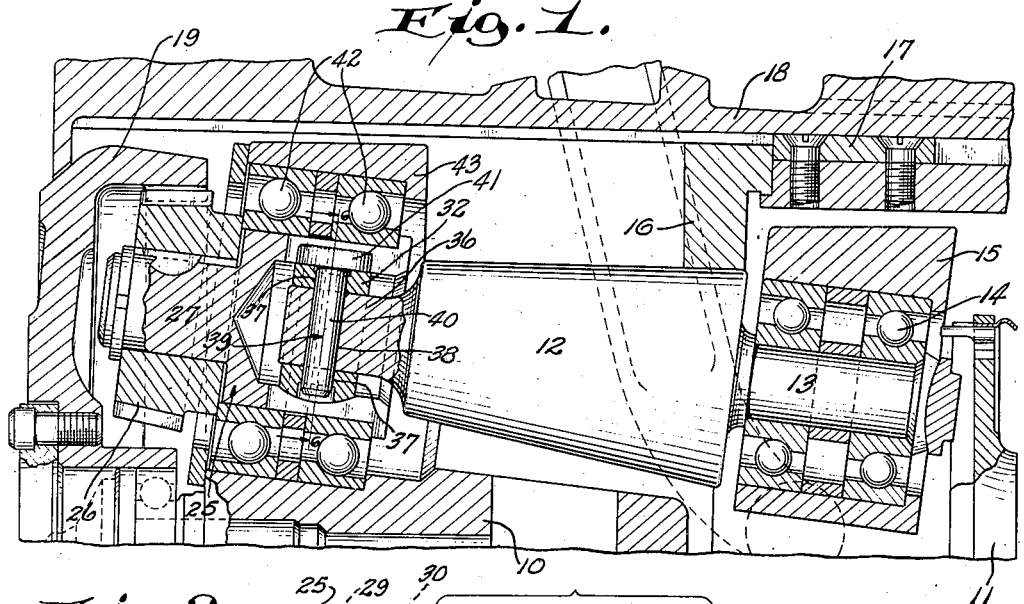
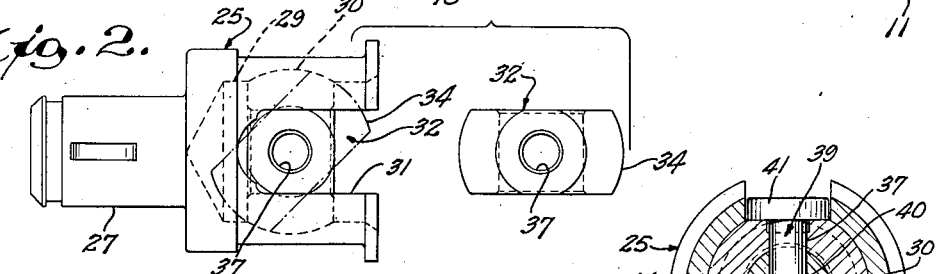
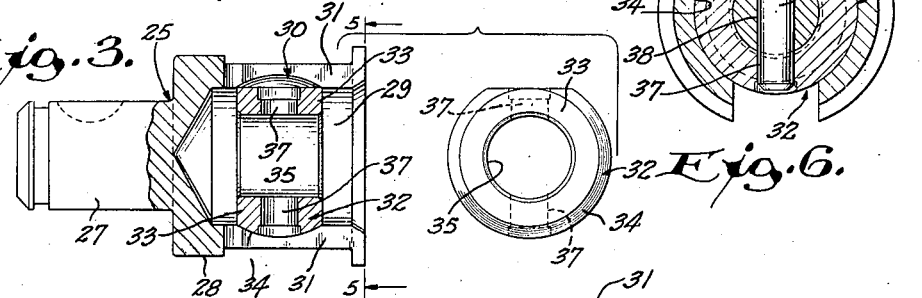
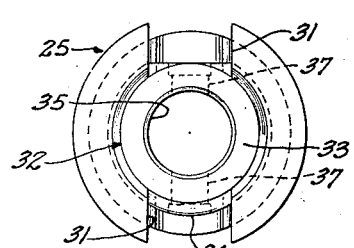
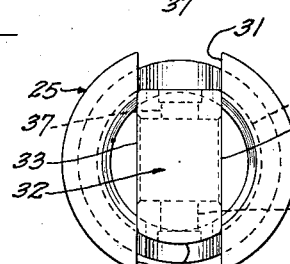
INVENTOR.
LOUIS A. GRAHAM.
BY John W. Michael
ATTORNEY.

Patented May 18, 1943

2,319,319

UNITED STATES PATENT OFFICE 2,319,319

TORQUE TRANSMITTING DEVICE

Louis A. Graham, Milwaukee, Wis., assignor to Graham Transmissions, Inc., Milwaukee, Wis., a corporation of Delaware Application April 15, 1942, Serial No. 439,023

6 Claims. (Cl. 64—7)

This invention relates to an improvement in torque-transmitting devices which embodies an improved universal joint construction, and which, while capable of various uses and applications, is particularly designed and adapted for advantageous use in transmitting the torque developed by planet rollers of a variable speed planetary transmission to the ring or orbit gear fixed to the output shaft of the transmission.

An object of the invention is to provide a device of this character which is rugged and durable and yet extremely simple in its construction, the device employing a minimum number of parts, and these parts being readily and easily assembled and yet in the assembly functioning not only to effectively transmit the torque but to provide for the effective building up of the required traction or working pressure between the planet rollers and their control ring and at the same time compensating for unavoidable inaccuracies in the machining or in the other operations resorted to in the production of the parts that go to make up the transmission.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a fragmentary view partly in longitudinal, vertical cross section and partly in side elevation, showing a torque-transmitting device embodying the present invention.

Figure 2 is a group view in top plan illustrating the socket of the shaft of the torque-transmitting device and the ball member that cooperates with the socket of the shaft to constitute the universal joint of the device, the ball member being shown prior to and also partially assembled to illustrate how these parts are brought together;

Figure 3 is a group view illustrating the socket of the shaft, partly in side elevation and partly in longitudinal, vertical cross section, and showing the ball member as finally assembled with the socket of the shaft and also illustrating it in side elevation as it is positioned prior to its assembly with the socket of the shaft;

Figure 4 is a view in end elevation showing the entrance end of the socket of the shaft and also illustrating how the ball member is inserted through the slots of the shaft during the assembling of the two parts;

Fig. 5 is a view in end elevation of the entrance end of the socket of the shaft and showing the ball member as finally assembled therewith; and Figure 6 is a view in transverse cross section taken on line 6—6 of Figure 1.

Referring to the drawing, and more especially to Figure 1, it will be seen that it is there illustrated a portion of the variable speed planetary transmission of the type fully disclosed in United States Letters Patent No. 1,887,505, granted on November 15, 1932, to George H. Gibson, for "Variable speed transmission." While the invention is not restricted in its uses or applications to this type of transmission, it may be used therein to substantial advantage, and the various new points and advantages of this device may perhaps be best appreciated when its use in a device of this sort is understood.

In general, a variable speed transmission of this type comprises a plurality of longitudinally tapered planetary rollers supported for rotation with and with respect to a rotary carrier. The carrier is driven by an input or drive shaft so that the rollers revolve with the carrier and also rotate about their respective axes. The rollers are controlled in their action by an axially movable control ring which is adjusted lengthwise by the rollers. Each roller carries a planetary pinion which meshes with an internal ring or orbit gear connected to the output shaft. In a device of this kind it is essential that some measures be taken to develop a working or traction pressure between the planet rollers and their control ring. In a transmission of the Gibson type the rollers are pivoted or fulcrummed at or adjacent their small ends, and their large ends are constrained to swinging movement in a plane radially to the carrier so that the rollers under the influence of centrifugal force, or under the influence of some other convenient and practical source of force, are tilted or forced outwardly into pressure contact with their control ring at all times when the transmission is running. Mounting the rollers so that they may be free to tilt or swing into pressure contact with their control ring and yet so combining them that the other elements of the transmission with the torque developed by them will be effectively transmitted to the internal ring or orbit gear, and consequently to the output shaft, has presented a serious problem in this art, one for which a solution has long been sought.

The torque-transmitting device embodying the present invention affords a highly satisfactory and effective solution of this problem in that the torque developed by the planet rollers is effectively transmitted to the internal or orbit gear fixed to the output shaft and in that the rollers are free to respond to the biasing action of the centrifugal force, or other source of force, and development of the requisite working pressure between them and their control ring is assured. To accomplish this the rollers must be universally mounted, and the universal mounting at the same time provides for any inaccuracies in machining or in construction.

Referring now to Figure 1, the numeral 10 designates a fragment of a rotary carrier driven from an input shaft, a portion of which is shown at 11. One of the planet rollers mounted on the carrier is illustrated at 12. The planet roller 12 is provided at its large end with an integral trunnion 13 which is rotatably supported on the adjacent end plate of the carrier by means of ball bearings 14 carried by pillow blocks or guides 15 which are slidably mounted in radial guideways of the carrier. For a more complete disclosure of this type of construction, which, per se, forms no part of the present invention, reference is made to the United States Letters Patent 2,267,034, granted December 23, 1941, to Alain Madle, for "Variable speed transmission." The axially adjustable control or traction ring which controls the action of the rollers is designated at 16, and although adjustable lengthwise of the rollers is constrained against rotation by virtue of its being keyed, as at 17, to the housing 18 of the transmission.

The torque-transmitting device embodying the present invention is interposed between the small end of the roller 12 and the orbit gear 19 which is fixed to the output shaft of the transmission in the usual way. This torque-transmitting device comprises a short shaft designated generally at 25. A planet pinion 26 is keyed or otherwise suitably fixed to the reduced end 27 of this short shaft. Beyond its reduced end 27, the shaft 25 is enlarged, as at 28, and this enlarged portion 28 is provided with a socket 29 which opens out through one end of the shaft. The cavity of the socket is provided with a spherical formation 30. Diametrically opposite slots 31 are provided in the socketed end of the shaft and intersect the spherical formation 30 and also extend out through the entrance end of the socket.

A flattened ball member, designated generally at 32, is provided. This ball member is of ring-like form and has flat side faces 33. The thickness of the ball member is such that it is a clearance fit in the slots 31 when its flat side faces are presented to the side walls of the slots. This permits the ball member to be slid or inserted through the slots into the cavity of the socket 29 and to be brought into a position wherein it is concentric with the spherical formation 30 thereof. The ball member 32 has its outer periphery 34 of spherical form and of substantially or approximately the same diameter as the spherical formation 30 so that after the ball member is inserted in the socket and brought into concentric relation with the spherical formation 30 thereof, it may be rotated to bring its spherical formation 34 into bearing contact with the spherical formation 30 in a manner illustrated in Figures 2, 3, and 5.

In the assembly, the central opening 35 of the ball member is coaxially disposed with respect to the axis of the socket, and it receives a trunnion 36 integral with the small end of the roller. The ring member 33 is formed with diametrically opposite openings 37 and a trunnion 36 is provided with transverse opening 38 which is alined with the openings 37. A headed coupling or driving pin, designated generally at 39, has its shank 40 extended through these openings 37 and 38 and has its head 41, which is of circular form, fitted in one of the slots 31. The shank 40 of the coupling or driving pin is preferably a drive or press fit in the openings 37 and 38, and its head 41 is rounded (spherical, cylindrical, or barrel shaped) and is a clearance fit in the slot 31. Since the rounded pin permits rotation of the roller and ball assembly about the axis of the pin, and also about an axis through the center of the ball and perpendicular to the plane passing through the center of the two slots, it permits complete universality of the mounting.

The outer peripheral portion of the enlarged portion 28 of the shaft is supported in a double ball bearing assembly 42 carried by one of the end members 43 of the rotary carrier so that the shaft is supported for rotation about a fixed axis.

The roller, therefore, while effectively coupled to the shaft, is permitted by the universal mounting to maintain pressure contact radially with the control ring 16 as the roller rotates about its own axis, at the same time compensating for inaccuracies in machining and inevitable eccentricity.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A universal joint comprising a socket having a cavity of spherical formation and also having diametrically opposite slots intersecting said cavity and extending out through the entrance end of the socket, a flattened ball member of a thickness corresponding to the width of said slots so that it may be slid through the slots into a position wherein it is concentric with said cavity, said ball member having its outer peripheral portion of spherical formation and being of substantially the same diameter as the spherical formation of the cavity whereby when the ball member is concentrically disposed in said cavity it may be rotated to bring said spherical formations into universal bearing engagement with each other, said ball member having a central opening alined with the entrance to the socket when the ball and socket are assembled, a torque transmitting member having a trunnion fitted in said opening, said ball member and said trunnion having alined transverse openings, and a headed coupling pin having its shank extended through said openings of said ball member and said trunnion and having its head disposed in one of said slots and in driving engagement with the walls thereof.

2. A universal joint comprising a shaft having a socket whose cavity is partially, at least, of spherical formation, said socket having slots intersecting the spherical formation of the cavity and extending out through the entrance end of the socket, a flattened ball member insertible through the slots of the socket and having its outer periphery of spherical formation and adapted to have bearing contact with the spherical formation of the cavity of the socket, a torque transmitting member supported on the ball member, and a driving element interconnecting said ball member and said torque transmitting member and having a floating driving engagement with the walls of one of said slots.

3. In a universal joint, the subcombination of a socket whose cavity is partially, at least, of spherical formation, said socket having a slot intersecting the spherical formation of the cavity and extending out through the entrance end of the socket, and a flattened ball member insertible through the slot of the socket and having its outer periphery of spherical formation and adapted to have bearing contact with the spherical formation of the cavity.

4. A universal joint comprising a torque transmitting shaft having a socket provided with a cavity of spherical formation and also having diametrically opposite slots intersecting the cavity and extending out through the entrance end of the socket, a flattened ball member insertible through said slots to a position wherein it is concentric with the spherical formation of the cavity, the outer peripheral surface of the ball member being of spherical formation and of substantially the same diameter as the spherical formation of the cavity whereby when the ball member is concentrically disposed with respect to the spherical formation of the cavity the spherical formations of the ball member and the cavity may be brought into bearing contact, a headed coupling pin combined with the ball member and coacting with one of the slots of the socket to provide a driving connection between the ball member and the socket, and a torque transmitting member supported in the ball member and having a driving connection with said coupling pin.

5. A universal joint comprising a shaft having a socket whose cavity is partially, at least, of spherical formation, said socket having diametrically opposite slots intersecting the spherical formation of its cavity and extending out through the entrance end of the socket, a ring-like ball member insertible through the slots of the socket and having its outer periphery of spherical formation and adapted to have bearing contact with the spherical formation of the cavity of the socket, a torque transmitting member having a trunnion supported in the central opening of the ball member, and a coupling pin with rounded periphery interconnecting said trunnion, said ball member, and said socket.

6. A universal joint comprising a shaft having a socket at one end provided with an internal cavity of spherical formation, said socket having diametrically opposite slots intersecting the spherical formation of the cavity and extending out through the entrance end of the socket, a flattened ball member insertible through the slots of the socket to a position concentric to the spherical formation thereof, said ball member having its outer peripheral surface of spherical formation and corresponding in diameter to the diameter of the spherical formation of the socket whereby the ball member after insertion through the slots may be rotated into bearing contact with the spherical formation of the socket, said ball member having diametrically opposite openings, a trunnion insertible in the ball member and having the transverse opening alignable with the diametric openings of the ball member, and a headed coupling pin having its shank extending through the diametrically opposite openings of the ball member and press-fitted in the transverse opening of the trunnion and having its head disposed in one of the slots of the socket and in floating driving engagement with the side walls thereof.

LOUIS A. GRAHAM.